United States Patent
Wu et al.

(10) Patent No.: US 9,249,255 B2
(45) Date of Patent: Feb. 2, 2016

(54) MODIFIED EPOXY RESIN COMPOSITION USED IN HIGH SOLIDS COATING

(75) Inventors: Yan Wu, Shanghai (CN); Chen Chen, Shanghai (CN); Yue Shen, Shanghai (CN); Yurun Yang, Shanghai (CN)

(73) Assignee: Blue Cube IP LLC, Midland, MN (US)

(*) Notice: Subject to any disclaimer, the term of this patent is extended or adjusted under 35 U.S.C. 154(b) by 0 days.

(21) Appl. No.: 14/385,816

(22) PCT Filed: Mar. 20, 2012

(86) PCT No.: PCT/CN2012/072613
§ 371 (c)(1),
(2), (4) Date: Sep. 17, 2014

(87) PCT Pub. No.: WO2013/138994
PCT Pub. Date: Sep. 26, 2013

(65) Prior Publication Data
US 2015/0051317 A1 Feb. 19, 2015

(51) Int. Cl.
*C09D 163/02* (2006.01)
*C09D 7/00* (2006.01)
*C09D 193/00* (2006.01)
*C08G 59/24* (2006.01)
*C08L 63/00* (2006.01)
*C09D 163/00* (2006.01)
*C08G 59/22* (2006.01)
*C08G 59/62* (2006.01)
*C08G 59/64* (2006.01)

(52) U.S. Cl.
CPC ............ *C08G 59/245* (2013.01); *C08G 59/223* (2013.01); *C08L 63/00* (2013.01); *C09D 163/00* (2013.01)

(58) Field of Classification Search
None
See application file for complete search history.

(56) References Cited

U.S. PATENT DOCUMENTS

| 2,985,622 A | 5/1961 | Leppert | |
|---|---|---|---|
| 5,736,620 A | 4/1998 | Earls et al. | |
| 2007/0202339 A1 | 8/2007 | Yoshida et al. | |
| 2009/0020039 A1* | 1/2009 | Fenn et al. | 106/218 |
| 2009/0203813 A1* | 8/2009 | Lee | 523/400 |
| 2014/0296384 A1* | 10/2014 | Hazra | 523/437 |

FOREIGN PATENT DOCUMENTS

| CN | 102241806 A | 11/2011 |
|---|---|---|
| DE | 19526151 A1 | 1/1997 |
| JP | 11323246 | 11/1999 |
| JP | 2007246864 A | 9/2007 |
| KR | 10-0559055 B1 | 3/2006 |
| WO | 03042275 A1 | 5/2003 |

OTHER PUBLICATIONS

Yong Chen et al., "The Study on the Cardonal Modified Epoxy Resin," Information of Copper Clad Laminate, No. 2, 2011, pp. 25-28, Abstract Only.
Jiang He et al., "Study on the Anacardol Modified Epoxy Resin," Paint & Coatings Industry, No. 10, 1999, pp. 5-7, Abstract Only.

* cited by examiner

Primary Examiner — Michael J Feely

(57) ABSTRACT

This invention relates to a cardanol modified epoxy resin composition, especially, relates to a cardanol and/or dihydric phenol modified epoxy resin composition, a process making thereof and its application in low VOC high solids coating.

6 Claims, No Drawings

MODIFIED EPOXY RESIN COMPOSITION USED IN HIGH SOLIDS COATING

FIELD

This invention relates to a cardanol modified epoxy resin composition, especially, relates to a cardanol and/or dihydric phenol modified epoxy resin composition, and its application in low volatile organic compounds (VOC) high solids coating.

BACKGROUND

Epoxy based anti-corrosion coatings are widely used for the protection of metal and concrete substrates. Due to increasing awareness of environmental protection and severe environmental requirements, low VOC coating system attracted more and more attention from both paint producer and end customers. From technical view of point, one approach to achieve low VOC coating is to prepare high solids coating with reduced solvent addition using low viscosity epoxy.

In the past, solid epoxy resins such as D.E.R.™ 671 (commercial product of the Dow Chemical Company) are widely used in anti-corrosion coatings. However, D.E.R.™ 671 is not suitable for the low VOC high solids epoxy coatings because of its solid state. Large amount of solvent is demanded to dissolve and dilute them which hinder the epoxy resin from low VOC high solids applications. Usually, D.E.R.™ 671 is supplied with 25% xylene and the resin solution commercial grade name is D.E.R.™ 671-X75.

The coating based on liquid epoxy such as D.E.R.™ 331 (commercial product of the Dow Chemical Company) requires less solvent, however, is quite brittle. This is a critical issue for an anti-corrosion coating which requires high flexibility and good adhesion on substrates.

Reactive diluents can significantly reduce the viscosity of the system but at the same time compromise the reactivity or functionality of the resin part. This brings long drying time or poor chemical resistance to the coating. Meanwhile, reactive diluents are always more expensive than epoxy resins.

Fatty acid modified epoxy resins are one kind of popular modified epoxy in low VOC high solids coatings. However, the ester group generated from the reaction between epoxy and acid has the risk to hydrolyse, since ester group is inclined to hydrolyze.

It is therefore, still desired in the art an epoxy resin giving both lower viscosity and higher flexibility so that it is very suitable for the low VOC high solids coating application.

SUMMARY

The present invention provides an epoxy resin composition comprising, based on the total weight of the epoxy resin composition, i) from 10% to 90% by weight of a liquid epoxy resin of formula (I); and ii) from 10% to 90% by weight of a compound of formula (V);

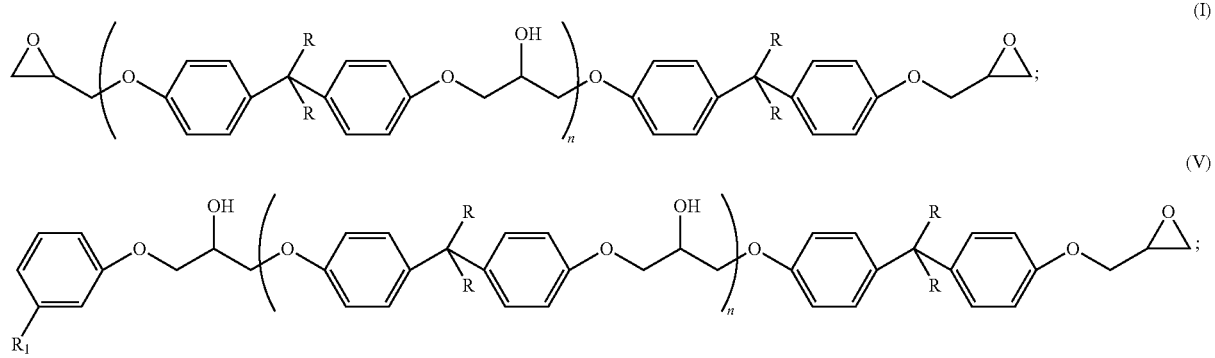

wherein n is independently 0 or 1; R is independently H or —$CH_3$; and $R_1$ is —$C_{15}H_{25}$, —$C_{15}H_{27}$, —$C_{15}H_{29}$, or —$C_{15}H_{31}$.

Optionally, the epoxy resin composition of the present invention further comprises, based on the total weight of the composition, from 10% to 70%, preferably from 15% to 55% by weight of a compound of formula (VI):

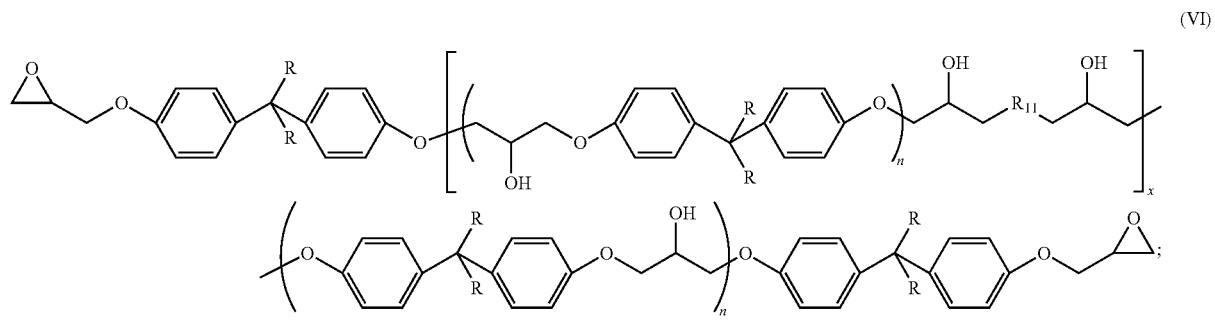

wherein x is 1 or 2; n is independently 0 or 1; each R is independently H or CH$_3$; and R$_{11}$ is a fragment of a dihydric phenol.

R$_{11}$ is represented by formula (VII),

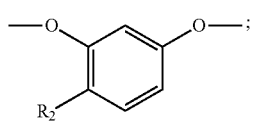

(VII)

wherein R$_2$ is independently H or a C$_1$-C$_{15}$ alkyl or alkenyl group; or
is represented by formula (VIII),

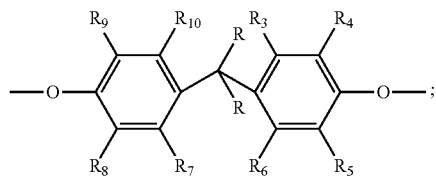

(VIII)

wherein each R is independently H or —CH$_3$; and R$_3$ to R$_{10}$ is each independently H or a C$_1$-C$_6$ alkyl group.

The present invention further provides a low VOC high solids coating comprising the modified epoxy resin composition, and one or more of a hardener, an organic solvent, a pigment, a filler, and a flow control agent.

DETAILED DESCRIPTION

The suitable raw material liquid epoxy resin is from 60% to 95%, preferably, from 70% to 90% by weight based on the total weight of the mixture, of a diglycidylether of bisphenol, such as Bisphenol A and Bisphenol F, wherein the epoxy equivalent weight (EEW) of the raw material liquid epoxy resin is from 150-250, preferably from 160-220, more preferably from 170-200. The epoxy resin is in liquid state.

The suitable raw material liquid epoxy resin is in the chemical formula (I) below,

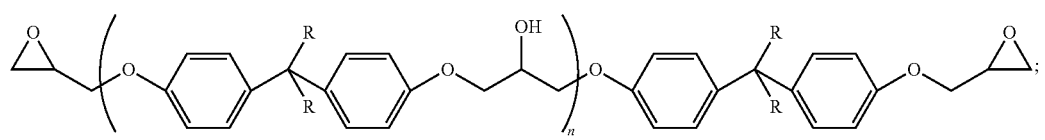

(I)

wherein n is 0 or 1. Most preferably, n is 0. The average n value of the liquid epoxy resin (I) is from 0 to 1. Preferably, it is from 0 to 0.5. Most preferably, it is from 0 to 0.3. R is independently H or —CH$_3$.

As used herein, the term "liquid epoxy resin" refers to the resin in a liquid state without adding any solvent. To achieve liquid state, the Epoxy Equivalent Weight (EEW) of the liquid epoxy resin is in the range of 150 to 250. Preferably, the EEW of the liquid epoxy resin is from 170 to 220. More preferably, it is from 175 to 200.

Suitable examples of the raw material liquid epoxy resin includes, but not limited to D.E.R.™ 331, which is a commercial product of the Dow Chemical Company; D.E.R.™ 354 of the Dow Chemical Company; D.E.R.™ 332 of the Dow Chemical Company; D.E.R.™ 330 of the Dow Chemical Company; D.E.R.™ 383 of the Dow Chemical Company.

The raw material liquid epoxy resin is reacted with "cardanol". "Cardanol" is one component of cashew nut shell liquid (CNSL), an oil isolated from the shell of the cashew nut. The structure of cardanol is a phenol containing one hydroxyl group, and an aliphatic side chain R$_1$ in the meta-position, as shown in the chemical formula (II). R$_1$ is —C$_{15}$H$_{25}$, —C$_{15}$H$_{27}$, or —C$_{15}$H$_{29}$. The content range of the cardanol is from 5% to 40%, preferably from 10% to 30%, by weight based on the total weight of the reacting mixture.

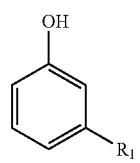

(II)

Optionally, the raw material liquid epoxy resin could further be reacted with, from 0.1% to 20%, preferably from 0.1% to 15%, by weight based on the total weight of the mixture, a dihydric phenol. The term "dihydric phenol" refers to a phenolic compound containing 2 hydroxyl groups. As used herein, the dihydric phenol refers to either of the two structures illustrated: a phenol with two hydroxyl groups on one benzene ring in the chemical formula (III), wherein R$_2$ is H or a C$_1$-C$_{15}$ aliphatic chain; or a composition containing two benzene ring each with one hydroxyl group on it in the chemical formula (IV), wherein R is H or —CH$_3$; and R$_3$ to R$_{10}$ is H or a C$_1$-C$_6$ aliphatic chain.

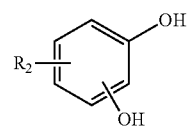

(III)

-continued

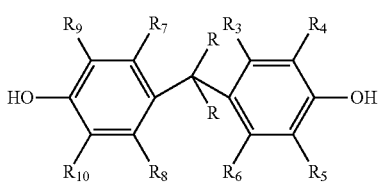

(IV)

One example of the phenol contains two hydroxyl groups is cardol. "Cardol" is also one component of cashew nut shell liquid (CNSL). The structure of cardol is a 1,3-Dihydroxybenzene with a side chain at position 5, the side chain is —$C_{15}H_{25}$, —$C_{15}H_{27}$, or —$C_{15}H_{29}$.

Another example of a phenol containing two hydroxyl groups is resorcinol.

The examples of compositions containing two benzene rings each with one hydroxyl group in the chemical formula (IV) are Bisphenol A and Bisphenol F.

The modified epoxy resin composition of the present invention is prepared according to known methods, for example, a modification reaction of an epoxy resin with phenols, wherein the reactive hydrogen atom is reactive with an epoxy group in the epoxy resin.

The modification reaction may be conducted in the presence or absence of a solvent with the application of heating and mixing. The modification reaction may be conducted at atmospheric, superatmospheric or subatmospheric pressures and at temperatures of from 20° C. to 260° C., preferably, from 80° C. to 200° C., and more preferably from 100° C. to 180° C.

The time required to complete the modification reaction depends upon the factors such as the temperature employed, the chemical structure of the compound having more than one reactive hydrogen atom per molecule employed, and the chemical structure of the epoxy resin employed. Higher temperature may require shorter reaction time whereas lower temperature requires a longer period of reaction time.

In general, the time for completion of the modification reaction may range from 5 minutes to 24 hours, preferably from 30 minutes to 8 hours, and more preferably from 30 minutes to 4 hours.

A catalyst may also be added in the modification reaction. Examples of the catalyst may include basic inorganic reagents, phosphines, quaternary ammonium compounds, phosphonium compounds and tertiary amines. Particularly, catalysts suitable to the present invention include, but not limited to, NaOH, KOH, ethyl triphenyl phosphonium acetate, imidazole, and triethylamine. The catalyst may be employed in quantities of from 0.01 percent to 3 percent, preferably from 0.03 percent to 1.5 percent, and more preferably from 0.05 percent to 1.5 percent by weight based upon the total weight of the epoxy resin.

Other details concerning a reaction useful in preparing the modified epoxy product of the present invention are provided in U.S. Pat. No. 5,736,620 and in Handbook of Epoxy Resins by Henry Lee and Kris Neville, incorporated herein by reference.

In one embodiment of the present invention, the raw material epoxy resin, cardanol, and optional dihydric phenol are mixed in proper amount as described above, and dissolved and heated under the proper condition of modification reaction as described above to form the modified epoxy resin composition of the present invention.

The modified epoxy resin composition of the present invention comprises, based on the total weight of the modified epoxy resin composition: i) from 10% to 90%, preferably from 30% to 70% by weight of at least one liquid epoxy resin in the chemical formula (I) below

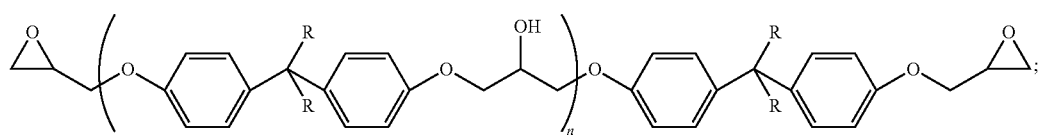

(I)

and ii) from 10% to 90%, preferably from 30% to 70% by weight of at least one cardanol modified epoxy compound in the chemical formula (V) below

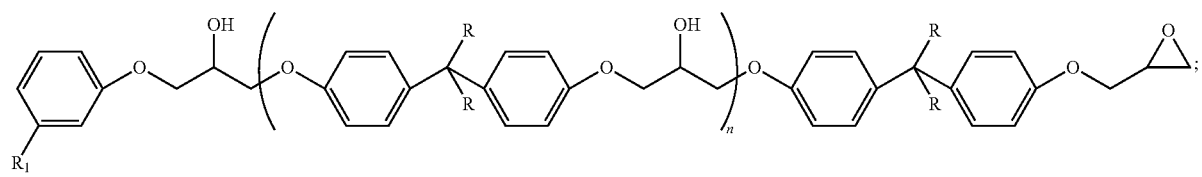

(V)

wherein n of the liquid epoxy resin (I) and the cardanol modified epoxy compound (V) is 0 or 1. Most preferably, n is 0. The average n value is independently from 0 to 1. Preferably, it is from 0 to 0.5. Most preferably, it is from 0 to 0.3. R is independently H or —$CH_3$. $R_1$ is —$C_{15}H_{25}$, —$C_{15}H_{27}$, or —$C_{15}H_{29}$.

The EEW of the liquid epoxy resin (I) is in the range from 150 to 250, the preferred EEW of the liquid epoxy resin is from 170 to 220, and more preferred EEW of the liquid epoxy resin is from 175 to 200.

The EEW of the cardanol modified epoxy (V) is in the range from 550 to 850, the preferred EEW of the cardanol modified epoxy is from 580 to 800, and more preferred EEW of the cardanol modified epoxy is from 600 to 750.

In another embodiment, the epoxy resin composition of the present invention comprises, based on the total weight of the composition, from 20% to 75%, preferably from 35% to 60% by weight of the compound of formula (I), from 20% to 75%, preferably from 35% to 60% by weight of the compound of formula (V), and from 0.1% to 20%, preferably from 0.1% to 5% of a compound of formula (X):

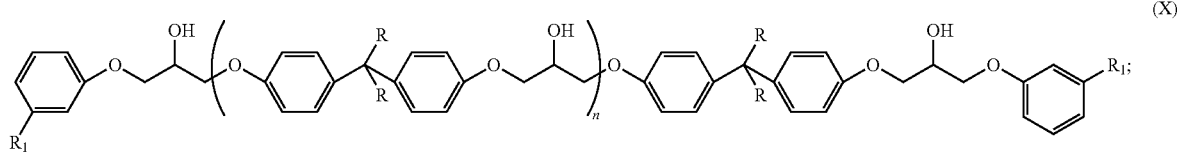

wherein n is 0 or 1; R is independently H or —CH$_3$; and R$_1$ is independently —C$_{15}$H$_{25}$, —C$_{15}$H$_{27}$, or —C$_{15}$H$_{29}$.

Optionally, the epoxy resin composition of the present invention may further comprises, based on the total weight of the composition, of from 10% to 70%, preferably from 15% to 55% by weight of a dihydric phenol modified epoxy compound of formula (VI):

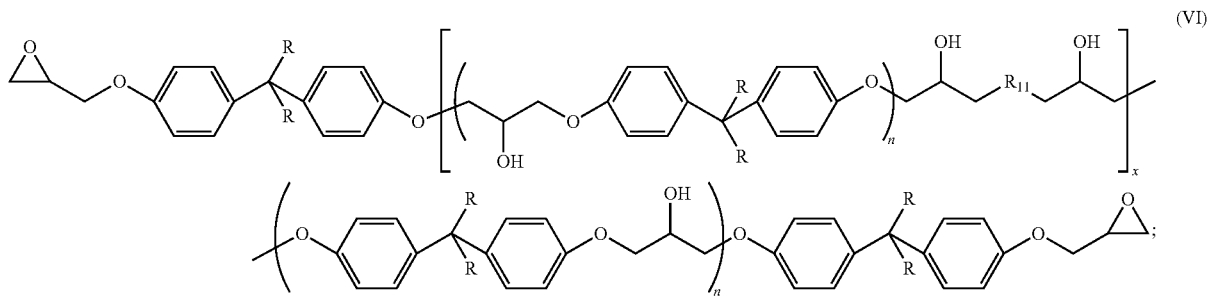

wherein x is 1 or 2, preferably x is 1; each n is independently 0 or 1, more preferably n is 0; R is independently H or CH$_3$; and R$_{11}$ is a fragment of a dihydric phenol.

In yet another embodiment, the epoxy resin composition of the present invention further comprises, based on the total weight of the composition, from 0.1% to 15%, preferably from 0.1% to 5% by weight of a compound of formula (IX):

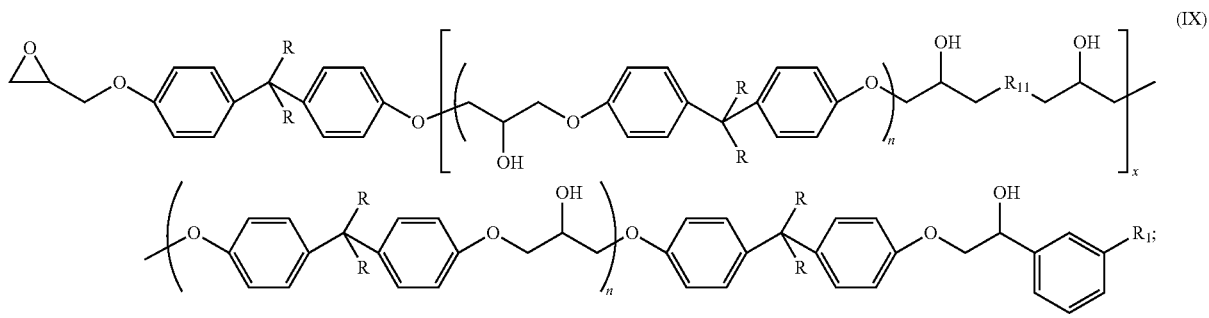

wherein x is 1 or 2, more preferably x is 1; n is independently 0 or 1, more preferably n is 0; each R is independently H or CH$_3$; R$_1$ is independently —C$_{15}$H$_{25}$, —C$_{15}$H$_{27}$, or —C$_{15}$H$_{29}$, and R$_{11}$ is a fragment of a dihydric phenol.

The EEW of the dihydric phenol modified epoxy is in the range from 400 to 700, the preferred EEW of the dihydric phenol modified epoxy is from 430 to 650, more preferred EEW of the dihydric phenol modified epoxy is from 450 to 600.

The fragment of a dihydric phenol, R$_{11}$, is a compound represented by formula (VII),

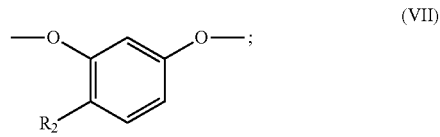

wherein R$_2$ is independently H or a C$_1$-C$_{15}$ alkyl or alkenyl group.

In a more preferred embodiment, the fragment of a dihydric phenol, R$_{11}$, is a cardol.

In another embodiment, the fragment of a dihydric phenol, R$_{11}$, is a compound represented by formula (VIII),

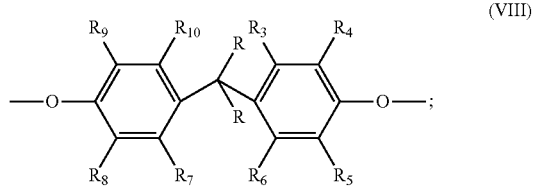

wherein each R is independently H or —CH$_3$; R$_3$ to R$_{10}$ is each independently H or a C$_1$-C$_6$ alkyl group.

A "coating" according to the present invention will generally be understood as a composition that, when cured, can form a substantially continuous film or layer. It will be appreciated that when the present modified epoxy resins are used in a coating according to the present invention, they can react with hardener, and form all or part of the film-forming resin of the coating. That is, the modified epoxy resin described herein will react, thereby contributing to the cure of the coating. In certain embodiments, one or more additional film-forming resins are also used in the coating. The hardener may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Amine based hardeners are preferred.

In one embodiment, the coating composition comprises a modified epoxy resin composition of the present invention, and with from 20% to 90%, preferably from 30% to 60% by weight, based on the total weight of the coating composition, a phenalkamine hardener.

Phenalkamine is the condensation product of cardanol, formaldehyde, and a polyamine through the Mannich reaction. Suitable examples of the phenalkamine hardner includes, but not limited to, commercialized product, Cardolite™ NC 541, Cardolite™ NC 541LV, Cardolite™ NX 2015. When the epoxy resin was cured with phenalkamine hardener, the coating formulation can be used in low temperature curing system.

The coating compositions may also include organic solvents. Suitable solvents include glycols, glycol ether alcohols, alcohols, ketones, and aromatics, such as xylene and toluene, acetates, mineral spirits, naphthas and/or mixtures thereof. "Acetates" include glycol ether acetates.

The coating composition is prepared with techniques which are well known in the coating art. The coating composition may include pigments and fillers. Exemplary filler materials such as calcium carbonate, fumed silica, precipitated silica, magnesium carbonate, talc, and the like. Exemplary pigments such as titanium dioxide, iron oxides, carbon black and the like. The fillers and pigments may be used singly or in combination.

If desired, the coating compositions can comprise other optional materials well known in the art of formulating coatings, such as plasticizers, anti-oxidants, hindered amine light stabilizers, UV light absorbers and stabilizers, flow control agents, thixotropic agents, organic cosolvents, reactive diluents, catalysts, grind vehicles, and other customary auxiliaries.

The coating composition may be applied by conventional application methods such as, for example, brushing, roller application, and spraying methods such as, for example, air-atomized spray, air-assisted spray, airless spray, high volume low pressure spray, and air-assisted airless spray.

The coating composition may be applied to a substrate such as, for example, metal, plastic, wood, stone, glass, fabric, concrete, primed surfaces, previously painted surfaces, and cementitious substrates.

The coatings of the present invention can be used alone, or in combination with other coatings. In one embodiment, the coatings are multi-layer coatings comprising the coating compositions of the present invention as a primer, a tie coat and, optionally, Topcoat.

The coating composition of the present invention can be used in applications including, but not limited to, marine coating and general anti-corrosion coating.

The coating composition coated on the substrate is dried, or allowed to dry, at a temperature of from −15° C. to 150° C., typically at room temperature.

EXAMPLES

I. Raw Materials

| MATERIALS | FUNCTION | CHEMICAL NAME | SUPPLIER |
|---|---|---|---|
| D.E.R.™ 331 | Epoxy | Diglycidylether of Bisphenol A | The Dow Chemical Company |
| D.E.R.™ 354 | Epoxy | Diglycidylether of Bisphenol F | The Dow Chemical Company |
| D.E.R.™ 664 UE | Epoxy | Diglycidylether of Bisphenol A | The Dow Chemical Company |
| D.E.R.™ 671-X75 | Epoxy (in xylene solution) | Diglycidylether of Bisphenol A | The Dow Chemical Company |
| Ethyl triphenyl phosphonium acetate | Catalyst | Ethyl triphenyl phosphonium acetate (70 wt. % methanol solution) | |
| Xylene | Solvent | | |
| Cardolite™ NC 541LV | Hardener | | Cardolite Cooperation |
| Cardolite™ NC 541 | Hardener | | Cardolite Cooperation |

II. Test Methods

| TEST | METHODS |
|---|---|
| Resin Viscosity | The Viscosities were tested using a Brookfield CAP 2000+ viscometer, 6# rotator, 400 rmp. |
| Solution Viscosity | 10 parts by weight xylene was used to dissolve 90 parts by weight epoxy resin. The Viscosities were tested using a Brookfield CAP 2000+ viscometer, 6# rotator, 400 rmp. |
| Pot life | The end of pot life was determined as the time required for doubling the initial viscosity after mixing with hardener. |
| Drying Time | Drying time was recorded using a BYK Gardner Drying Recorder. |
| Pendulum Hardness | ASTM D-4366 |
| Wedge bend | ASTM D-522 |
| Impact resistance | ASTM D-2794 |
| Anti-corrosion resistance | ASTM B-117 |

Example 1

92 parts by weight D.E.R.™ 331 and 8 parts by weight cardanol were mixed under nitrogen condition in a flask. After the mixture reached 90° C., 200 ppm ethyl triphenyl phosphonium acetate (70 wt. % methanol solution) was added as catalyst. The mixture was heated to 180° C. and kept at this temperature for 2 hours. The epoxy resin A was obtained. The product contained about 81 wt. % compound (I) and about 19 wt. % compound (V).

Example 2

85 parts by weight D.E.R.™ 331, 7.5 parts by weight cardanol and 7.5 parts by weight cardol were mixed under nitrogen condition. After the mixture reached 90° C., 300 ppm ethyl triphenyl phosphonium acetate (70 wt. % methanol solution) was added as catalyst. The mixture was heated to 170° C. and kept at this temperature for 3 hours. The epoxy resin B was obtained. The product contained about 57 wt. % compound (I), 17 wt. % compound (V) and 26 wt. % compound (VI).

Example 3

80 parts by weight D.E.R.™ 331 and 20 parts by weight cardanol were mixed under nitrogen condition. After the mixture reached 90° C., 400 ppm ethyl triphenyl phosphonium acetate (70 wt. % methanol solution) was added as catalyst. The mixture was heated to 160° C. and kept at this temperature for 4 hours. The epoxy resin C was obtained. The product contained about 55 wt. % compound (I) and about 45 wt. % compound (V).

Example 4

65 parts by weight D.E.R.™ 331 and 35 parts by weight cardanol were mixed under nitrogen condition. After the mixture reached 90° C., 350 ppm ethyl triphenyl phosphonium acetate (70 wt. % methanol solution) was added as catalyst. The mixture was heated to 180° C. and kept at this temperature for 3 hours. The epoxy resin D was obtained. The product contained about 20 wt. % compound (I) and about 80 wt. % compound (V).

Example 5

70 parts by weight D.E.R.™ 331, 15 parts by weight cardanol and 15 parts by weight cardol were mixed under nitrogen condition. After the mixture reached 90° C., 250 ppm ethyl triphenyl phosphonium acetate (70 wt. % methanol solution) was added as catalyst. The mixture was heated to 180° C. and kept at this temperature for 2 hours. The epoxy resin E was obtained. The product contained about 14 wt. % compound (I), 34 wt. % compound (V) and 52 wt. % compound (VI).

Example 6

64 parts by weight D.E.R.™ 331, 30 parts by weight cardanol and 6 parts by weight cardol were mixed under nitrogen condition. After the mixture reached 90° C., 300 ppm ethyl triphenyl phosphonium acetate (70 wt. % methanol solution) was added as catalyst. The mixture was heated to 190° C. and kept at this temperature for 1 hour. The epoxy resin F was obtained. The product contained about 11 wt. % compound (I), 68 wt. % compound (V) and 21 wt. % compound (VI).

Example 7

85 parts by weight D.E.R.™ 354, 10 parts by weight cardanol and 5 parts by weight resorcinol were mixed under nitrogen condition. After the mixture reached 90° C., 200 ppm ethyl triphenyl phosphonium acetate (70 wt. % methanol solution) was added as catalyst. The mixture was heated to 180° C. and kept at this temperature for 4 hours. The epoxy resin G was obtained. The product contained about 43 wt. % c compound (I), 21 wt. % compound (V) and 36 wt. % compound (VI).

Example 8

85 parts by weight D.E.R.™ 331, 10 parts by weight cardanol and 5% parts by weight bisphenol A were mixed under nitrogen condition. After the mixture reached 90° C., 350 ppm ethyl triphenyl phosphonium acetate (70 wt. % methanol solution) was added as catalyst. The mixture was heated to 160° C. and kept at this temperature for 5 hours. The epoxy resin H was obtained. The product contained about 56 wt. % compound (I), 23 wt. % compound (V) and 21 wt. % compound (VI).

Comparative examples 1 and 2 were carried out substantially as described in KR559055B1.

Comparative Example 1

In the flask equipped with a condenser and a stirrer were introduced 49.6 parts by weight D.E.R.™ 331 and 50.4 parts by weight cardanol and then the temperature was elevated up to 140° C. After the reaction was maintained for 5 hours, cooling was carried out. Catalyst was not used in this example, so that reaction was not completely finished. D.E.R.™ 331 is a commercially available substitute for YD-128. The epoxy resin I was obtained. Gas chromatography-mass spectrometry (GC-MS) method showed unreacted cardanol monomer remained in epoxy resin I, and the cardanol modified epoxy resin is in a range of less than 5 wt. % based on the total reaction product, epoxy resin I.

Comparative Example 2

In the flask equipped with a condenser and a stirrer were introduced 89.3 parts by weight D.E.R.™ 664 UE and 10.7 parts by weight cardanol and then the temperature was elevated up to 140° C. Then after the reaction was maintained for 5 hours, cooling was carried out. D.E.R.™ 664 UE is a solid with n being around 6, and is a commercially available substitute for YD-014. The epoxy resin J was obtained.

Comparative Example 3

97 parts by weight D.E.R.™ 331 and 3 parts by weight cardanol were mixed under nitrogen condition. After the mixture reached 90° C., 150 ppm ethyl triphenyl phosphonium acetate (70 wt. % methanol solution) was added as catalyst. The mixture was heated to 160° C. and kept at this temperature for 1 hours. The epoxy resin K was obtained. The product contained about 93 wt. % compound (I) and about 7 wt. % compound (V).

Comparative Example 4

57 parts by weight D.E.R.™ 331 and 43 parts by weight cardanol were mixed under nitrogen condition. After the mixture reached 90° C., 600 ppm ethyl triphenyl phosphonium acetate (70 wt. % methanol solution) was added as catalyst. The mixture was heated to 160° C. and kept at this temperature for 6 hours. The epoxy resin L was obtained. The product contained about 3 wt. % compound (I) and about 97 wt. % compound (V).

III. Results

Viscosity

| Examples | State | 25° C. Resin Viscosity (cps) | 35° C. Resin Viscosity (cps) | 45° C. Resin Viscosity (cps) | 5° C. 10% xylene solution viscosity (cps) | 25° C. 10% xylene solution viscosity (cps) |
|---|---|---|---|---|---|---|
| Epoxy resin A | Liquid | 11700 | 3168.7 | 1181.2 | 11250 | 940.3 |
| Epoxy resin B | Liquid | 31000* | 7987.5 | 2887.3 | 15626 | 1750.5 |
| Epoxy resin C | Liquid | 11900 | 3675.0 | 1368.7 | 11742 | 1108.7 |
| Epoxy resin D | Liquid | 14150 | 4725.0 | 1668.7 | 12368 | 1566.2 |
| Epoxy resin E | Liquid | NA | 28200 | 8175.6 | NA | 9393.7 |
| Epoxy resin F | Liquid | 32000* | 8287.5 | 3039.7 | 18525 | 2568.7 |
| Epoxy resin G | Liquid | NA | 36300 | 10024 | NA | 10550 |
| Epoxy resin H | Liquid | NA | 26650 | 7575.1 | NA | 7250.5 |
| Epoxy resin I | Liquid | 937.5 | 242.5** | NA | 843.5 | NA |
| Epoxy resin J*** | Solid | NA | NA | NA | NA | NA |
| Epoxy resin K | Liquid | 11057 | 3100.0 | 1024.5 | 10583 | 787.3 |
| Epoxy resin L | Liquid | 15500 | 5264.5 | 1985.3 | 15568 | 1623.4 |
| D.E.R. ™ 331 | Liquid | 11150 | 3150.3 | 1057.5 | 10875 | 806.5 |
| D.E.R. ™ 671-X75**** | Solid | NA | NA | NA | NA | 14306 |

*Test condition: 6# rotator, 100 rmp;
**Test condition: 6# rotator, 900 rmp;
***The softening point of Epoxy Resin J is around 100° C.; Epoxy resin J was dissolved in 50 parts by weight xylene used in performance tests.
****The softening point of D.E.R. ™ 671-X75 is from 75-85° C.; Commercially available product D.E.R. ™ 671-X75 was directly used for performance tests. The supply form contains 75 parts by weight epoxy resins and 25 parts by weight xylene.

D.E.R.™ 671-X75 is a common epoxy resin used in anti-corrosion coating, which is solid state. Even using 25 parts xylene to dissolve 75 parts D.E.R.™ 671-X75, its solution viscosity is still very high (14306 cps). D.E.R.™ 671-X75 is not fit for low VOC high solids coating. Epoxy resin J (Comparative Example 2) is also solid epoxy with even higher solution viscosity than D.E.R.™ 671-X75. Thus, epoxy resin J cannot be used in low VOC high solids coating as well. Epoxy resins modified by cardanol, or cardanol and dihydric phenol according to our technology are all liquid state. The viscosities of the resins solutions (90 parts by weight resin and 10 parts by weight xylene) are lower than D.E.R.™ 671-X75 (75 parts by weight D.E.R.™ 671 and 25 parts by weight xylene). As a result, the resin shows better workability compared with solid epoxy resin D.E.R.™ 671-X75 and can be used in coating formulation with higher solids content.

Film Performance 90 weight by parts epoxy resins (besides epoxy resin J and D.E.R.™ 671-X75) was dissolved in 10 part by weight xylene and then was cured by Cardolite™ NC 541LV. Epoxy resin J was dissolved in 50 parts by weight xylene. D.E.R.™ 671-X75 was directed used. Epoxy resin J (50% xylene) and D.E.R.™ 671-X75 were also cured by Cardolite™ NC 541LV. The stoichiometry ratio of epoxy to amine is 1:1 for all the resins. Q-phos panel was used as substrate in most experiment, expect for Q panel used for anti-corrosion test. The paints were dried at 23° C. for 7 days.

1) Film Tack Free Time

| Examples | Film tack free time (h) |
|---|---|
| Epoxy resin A | 6.25 |
| Epoxy resin B | 6.5 |
| Epoxy resin C | 7 |
| Epoxy resin E | 8 |
| Epoxy resin G | 10 |
| Epoxy resin H | 6 |
| Epoxy resin I | 19 |
| Epoxy resin L | 15 |

Film tack free time is a probe of drying time. The smaller value means shorter drying time and faster drying speed, which is preferred. Comparative example epoxy resins I and L showed much slower drying than other modified epoxy resins.

2) Pot Life

| Examples | Pot life (min) |
|---|---|
| Epoxy resin A | 35 |
| Epoxy resin B | 35 |
| Epoxy resin C | 37 |
| Epoxy resin D | 39 |
| Epoxy resin E | 42 |
| Epoxy resin F | 45 |
| Epoxy resin H | 40 |
| D.E.R. ™ 331 | 31 |

Pot life suggested the operation window of paint. Longer pot life is preferred. It was clear that modified epoxy shows improved pot life compared with liquid epoxy resin D.E.R.™ 331.

3) Hardness

| Examples | Pendulum Hardness (s) |
|---|---|
| Epoxy resin A | 130 |
| Epoxy resin B | 111 |
| Epoxy resin C | 100 |
| Epoxy resin E | 81 |
| Epoxy resin H | 115 |
| Epoxy resin I | 14 |
| Epoxy resin L | 35 |

Comparative example epoxy resin I and L were much softer than other epoxy resins.

4) Wedge Bend

| Examples | Wedge bend (crack distance, cm) |
| --- | --- |
| Epoxy resin A | 0 |
| Epoxy resin B | 0 |
| Epoxy resin C | 0 |
| Epoxy resin D | 0 |
| Epoxy resin E | 0 |
| Epoxy resin F | 0 |
| Epoxy resin H | 0 |
| Epoxy resin K | 4.6 |
| D.E.R.™ 331 | 6.0 |
| D.E.R.™ 671-X75 | 1.3 |

Wedge bend indicates flexibility of the films. Epoxy resin K, D.E.R.™ 331 and D.E.R.™ 671-X75 all showed crack after applying wedge bending, implying brittle films produced by them. Epoxy resins modified by cardanol, or cardanol and dihydric phenol show higher flexibility.

5) Impact Resistance

| Examples | Impact resistance (4 pound*cm) Front/back |
| --- | --- |
| Epoxy resin A | 35/20 |
| Epoxy resin B | 70/55 |
| Epoxy resin C | 45/30 |
| Epoxy resin D | 55/50 |
| Epoxy resin E | 90/40 |
| Epoxy resin F | 65/50 |
| Epoxy resin H | 60/40 |
| D.E.R.™ 331 | 10/5 |
| D.E.R.™ 671-X75 | 30/20 |

Better impact resistance is found for epoxy resins modified by cardanol, or cardanol and dihydric phenol. D.E.R.™ 331 and D.E.R.™ 671-X75 showed lower impact resistance.

Anti-Corrosion Properties

| Resin | Epoxy resin C | Epoxy resin I |
| --- | --- | --- |
| Time for 5 mm corrosion extension at scribe (h) | 700 | 48 |

The salt spray resistance indicates that Epoxy resin I showed poor anti-corrosion properties.

Paint

| Ingredients | Weight percentage (%) |
| --- | --- |
| Feldspar powder | 41.4 |
| Iron oxide | 0.96 |
| Epoxy resin C | 27.86 |
| Butanol | 2.00 |
| Crayvallac super | 1.88 |
| Xylene | 9.00 |
| Byk® -A 530 | 0.11 |
| Cardolite NC 541 | 12.05 |
| Xylene | 4.74 |

Films were applied using this paint. The dry film thicknesses of the films were all about 80 um. Q panel is used as substrate. The paints were dried at 23° C. for 7 days.

| Test Items | Performance |
| --- | --- |
| Viscosity (cps, 1#, 200 rmp) | 644 |
| Film tack free time (h) | 4.5 |
| Pot life (min) | 63 |
| Hardness (s) | 67 |
| Wedge bend (crack distance, cm) | 2.8 |
| Impact resistance (4 pound*cm, Front/back) | 25/5 |
| Anticorrosive performance | Good |

The invention claimed is:
1. An epoxy resin composition comprising, based on the total weight of the epoxy resin composition,
   (i) from 10% to 75% by weight of a liquid epoxy resin of formula (I):

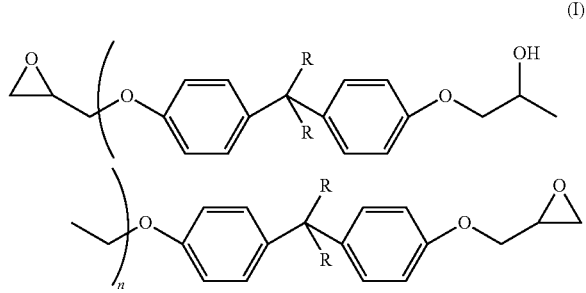

(I)

wherein n is 0 or 1; each R is independently H or —CH$_3$; and R$_1$ is —C$_{15}$H$_{25}$, —C$_{15}$H$_{27}$, or —C$_{15}$H$_{29}$;
(ii) from 10% to 75% by weight of a compound of formula (V);

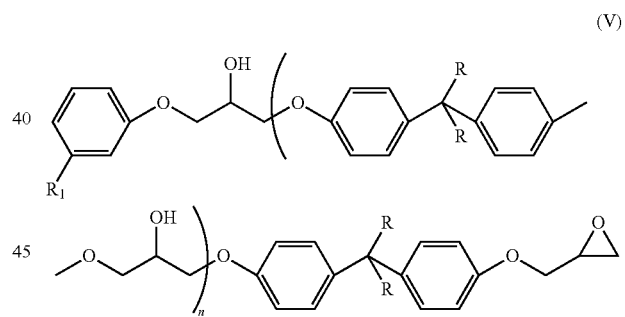

(V)

wherein n is 0 or 1; each R is independently H or —CH$_3$; and R$_1$ is —C$_{15}$H$_{25}$, —C$_{15}$H$_{27}$, or —C$_{15}$H$_{29}$; and
(iii) from 10% to 70% by weight of a compound of formula (VI);

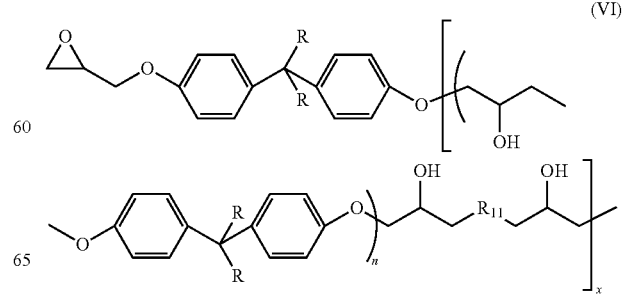

(VI)

-continued

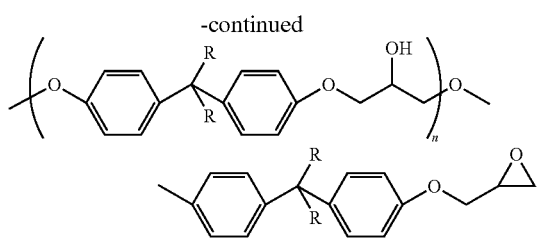

wherein x is 1 or 2; each n is independently 0 or 1; each R is independently H or —CH₃; and $R_{11}$ is represented by formula (VII),

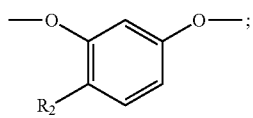

(VII)

wherein $R_2$ is independently H or a $C_1$-$C_{15}$ alkyl or alkenyl group.

2. The epoxy resin composition according to claim 1 which comprises, based on the total weight of the composition, from 20% to 70% by weight of the compound of formula (I), from 20% to 70% by weight of the compound of formula (V), and from 10% to 55% by weight of the compound of formula (VI).

3. The epoxy resin composition according to claim 1 wherein n in formula (I) and formula (V) is 0.

4. The epoxy resin composition according to claim 1 wherein x in formula (VI) is 1.

5. A low VOC high solids coating composition comprising the epoxy resin composition according to claim 1 and a phenalkamine hardener.

6. A low VOC high solids coating composition comprising the modified epoxy resin composition according to claim 1 and one or more of a hardener, an organic solvent, a pigment, a filler, and a flow control agent.

* * * * *